(12) United States Patent
Winters et al.

(10) Patent No.: US 9,085,837 B2
(45) Date of Patent: Jul. 21, 2015

(54) CONDUCTIVE FILTER MEDIA (71) Applicants: Eric Winters, North Augusta, SC (US);
John Lewis, North Augusta, SC (US);
Brian Fields, North Augusta, SC (US)

(72) Inventors: Eric Winters, North Augusta, SC (US);
John Lewis, North Augusta, SC (US);
Brian Fields, North Augusta, SC (US)

(73) Assignee: Southern Felt Company, Inc., North Augusta, SC (US)

(*) Notice: Subject to any disclaimer, the term of this patent is extended or adjusted under 35 U.S.C. 154(b) by 188 days.

(21) Appl. No.: 13/627,751

(22) Filed: Sep. 26, 2012

(65) Prior Publication Data

US 2014/0083065 A1 Mar. 27, 2014

(51) Int. Cl.
| B01D 46/00 | (2006.01) |
| D04H 5/06 | (2006.01) |
| B01D 46/52 | (2006.01) |
| D04H 5/02 | (2012.01) |
| B01D 39/12 | (2006.01) |
| B01D 39/16 | (2006.01) |
| B32B 5/02 | (2006.01) |
| B32B 5/08 | (2006.01) |
| B32B 5/26 | (2006.01) |
| B01D 46/42 | (2006.01) |

(52) U.S. Cl.
CPC ............ *D04H 5/06* (2013.01); *B01D 39/12* (2013.01); *B01D 39/1623* (2013.01); *B01D 46/52* (2013.01); *B32B 5/022* (2013.01); *B32B 5/028* (2013.01); *B32B 5/08* (2013.01); *B32B 5/26* (2013.01); *D04H 5/02* (2013.01); *B01D 46/4209* (2013.01); *B01D 2239/0241* (2013.01); *B01D 2239/065* (2013.01); *B32B 2262/0246* (2013.01); *B32B 2262/0253* (2013.01); *B32B 2262/0261* (2013.01); *B32B 2262/0276* (2013.01); *B32B 2262/101* (2013.01); *B32B 2262/103* (2013.01); *B32B 2307/202* (2013.01)

(58) Field of Classification Search
CPC ........................... B01D 46/10; B01D 46/2275
USPC ........................... 55/497, 499–500, 521, 527
See application file for complete search history.

(56) References Cited

U.S. PATENT DOCUMENTS

| 5,527,569 | A | 6/1996 | Hobson et al. |
| 6,117,802 | A | 9/2000 | Rohrbach et al. |
| 2008/0230464 | A1 | 9/2008 | Winstrup et al. |
| 2011/0265312 | A1 | 11/2011 | Choi et al. |

Primary Examiner — Robert Clemente
Assistant Examiner — Karla Hawkins
(74) Attorney, Agent, or Firm — McNair Law Firm, P.A.; Douglas W. Kim (57) ABSTRACT The above objectives are accomplished according to the present invention by providing a filter medium for operating environments needing static electricity dissipation to help reduce ignition sources comprising: a substrate of non-woven felt including a polymeric fiber; a conductive scrim having a grid of conductive filaments adjacent to said substrate layer; and, a top layer of non-woven felt including a polymeric fiber and copolymer fiber blend having a melt temperature greater than 100° C. wherein said substrate layer, said conductive scrim and said top layer are manufactured into said filter medium by mechanical web formation.

16 Claims, 7 Drawing Sheets

CONDUCTIVE FILTER MEDIA

CLAIM OF PRIORITY

This application claim priority on U.S. patent application Ser. No. 13/454,210 filed Apr. 24, 2012 and is a continuation-in-part thereof.

FIELD OF THE INVENTION

This invention is directed to filter media and more specifically, filter media having improved conductive properties and a method of making such a filter media.

BACKGROUND OF THE INVENTION

In certain manufacturing and other environments, particles in the air can be of sufficient particle size and proper combination to provide an undesirable combustive environment. Coal, sawdust, sugar, pollen, flour and other "dust" can ignite creating explosions resulting from very small particles with a high surface area to volume ratio (thereby making the collective or combined surface area of all the particles very large in comparison to a dust of larger particles) combine with air to create an explosive environment. Generally, dust is defined as powders with particles less than about 500 micrometers µm in diameter, but finer dust will present a much greater hazard than coarse particles by virtue of the larger total surface area of all the particles.

Dusts have a very large surface area compared to their mass. Since burning can only occur at the surface of a solid or liquid, where it can react with oxygen, this causes dusts to be much more flammable than bulk materials. For example, a 1 kg sphere of a material with a density of 1 $g/cm^3$ would be about 27 cm across and have a surface area of 0.3 $m^2$. However, if it was broken up into spherical dust particles 50 µm in diameter (about the size of flour particle), it would have a surface area of 1600 $m^2$.

This greatly increased surface area allows the material to burn much faster, and the extremely small mass of each particle allows it to catch on fire with much less energy than the bulk material, as there is no heat loss to conduction within the material. When this mixture of fuel and air is ignited, especially in a confined space such as a filtration baghouse, warehouse or silo, a significant increase in pressure is created, often more than sufficient to demolish the structure. Even materials that are traditionally thought of as non-flammable, such as aluminum or iron, or slow burning, such as wood, can produce a powerful explosion when finely divided, and can be ignited by even a small spark. Such metal powders are widely used in fireworks for their dramatic effects.

Below a certain value, the lower explosive limit (LEL), there is simply insufficient dust to support the combustion at the rate required for an explosion. It has been determined that a number that is 20% lower than the LEL is considered safe. Similarly, if the fuel/air ratio increases above the upper explosive limit, there is insufficient oxidant to permit combustion to continue at the necessary rate. It is advantageous to prevent dust from reaching sufficient concentrations to avoid explosions.

For the explosion to occur, there has to be an ignition source. For example, static electricity is a major cause of fires and explosions in many industries. The hazard of electrostatic spark ignition of flammable vapor can be minimized by taking actions to limit the accumulation of electrostatic charges to safe values. Of primary importance is the proper bonding and grounding of equipment and containers. However, dust filtration, pollution-control filters, because of their large surface area, can generate as much as 200 times the electrostatic charge generated in the same piping system without filtration. Additionally, filters with conductive properties can be used to dissipate static electricity to reduce the ignition source for fires and explosions.

For example, United States Patent Application Publication 2011/0265312 is directed to a filter medium with improved conductivity. However, this reference uses a conductive coating which is disposed on the filtration substrate using a variety of techniques. For example, in one embodiment, the filtration substrate can be saturated with the conductive coating. In another embodiment, the conductive coating can be painted or extruded onto the filtration substrate. In another embodiment, the filter media can include a bonding agent that bonds the conductive coating to the filtration substrate. The bonding agent can be formed from, for example, a polymer such as polyvinylidene chloride, acrylic latex, polyurethane dispersion, polyvinyl acetate, polyvinyl alcohol, and combinations thereof. The bonding agent can also optionally be conductive. Each of these methods requires a process to add material to the underlying filter substrate. Further, the coating is just that, a coating, and can be worn off or otherwise separated from the filer substrate undermining the utility of this reference.

Another attempt to create a conductive filter is described in United States Patent Application Publication 2008/0230464 which includes a textile substrate (with a defined first side and a second side and a machine and cross-machine direction), where the conductive pattern on the first side is in registration with the conductive pattern on the second side of the textile substrate. However, this reference is limited to the use of two conductive patterns that must have a continuous conductive pathway between the two patterns and across the textile substrate.

Another attempt to produce for a conductive filter media is described in U.S. Pat. No. 5,527,569 which discloses a microporous filtration layer having electrically conductive particles embedded therein. According to this reference, a filtration layer is preferably formed of expanded polytetrafluoroethylene (ePTFE) membrane filled with conductive particles and/or is coated on at least one side with a thin conductor. This reference, again, relies upon a coating for providing conductive properties.

U.S. Pat. No. 6,117,802 discloses nonwoven filter media that has a plurality of elongated generally hollow fibers, each having an internal cavity which has an opening, smaller than the cavity width, to the fiber surface and each retaining within the internal cavity an electrically conductive material. The electrically conductive material can be a large number of relatively small conductive solid particles. The small solid particles, which can be graphite, are permanently entrapped within the longitudinal cavities of the fibers without the use of an adhesive.

Accordingly, an object of the present invention is to provide a conductive filter media which has integrated conductive material for superior conductive properties without using a coating.

Another object of the present invention is to provide such a filter media that can be manufactured without a post-processing such as a coating.

Still another object of the present invention is to have a conductive filter with conductive pathways throughout the filter material regardless of planar direction.

SUMMARY OF THE INVENTION

The above objectives are accomplished according to the present invention by providing a filter medium for operating environments needing static electricity dissipation to help reduce ignition sources comprising: a substrate of non-woven felt including a polymeric fiber; a conductive scrim having a grid of conductive filaments sandwiched between said substrate layer; and, a top layer of non-woven felt including a polymeric fiber and copolymer fiber blend having a melt temperature greater than 100° C. wherein said substrate layer, said conductive scrim and said top layer are manufactured into said filter medium by mechanical web formation.

In one embodiment, the top layer has a weight between 1.0 oz and 6.1 oz, said bottom layer has a weight between 1.0 oz and 6.1 oz and said scrim has a weight between 1.0 oz and 6.0 oz. The top layer is between 13% and (6:8) of the total weight of said filter medium. The scrim is 10% and 75% of the total weight of said filter medium. The polymeric fiber includes material selected from the group consisting of: polyethylene, polypropylene, nylon, polyester, acrylic, carbon, PPS, meta-aramid, para-aramid, polyimide (P84), PTFE, glass, Belcotex, and any combination of these. The trademark Belcotex is used to refer to a fiber comprising $Al_2O_3$-modified silicic acid having approximately 94.5% $SiO_2$, 4.5% $Al_2O_3$, 0.5% or less $Na_2O$ and 0.5% or less of other components. The filter medium has a stiffness in the range of 1500 mg to 8000 mg using a Gurley apparatus.

The grid can include material selected from the group consisting of: silver, copper, gold, aluminum, zinc, nickel, brass, bronze, iron, platinum, steel, lead, stainless steel, and any combination of these. The filaments can be carbon treated. The filaments can included a spun fiber combined with second fiber. The second fiber can be polyester.

DESCRIPTION OF THE DRAWINGS

The construction designed to carry out the invention will hereinafter be described, together with other features thereof.

DESCRIPTION OF A PREFERRED EMBODIMENT

Figure 1:
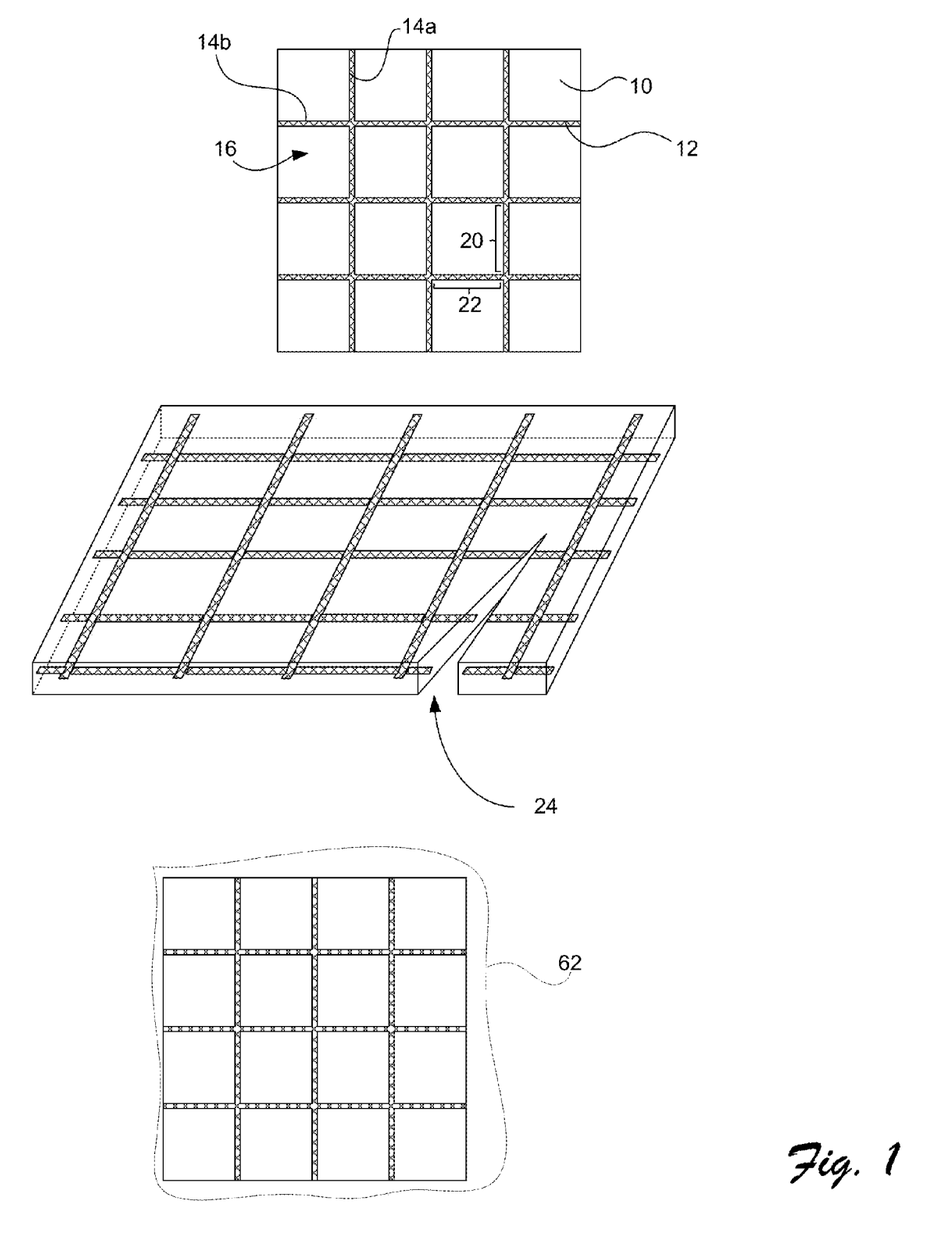
FIG. 1 is a perspective view and a top view of the invention.

Referring to FIG. 1, the invention is described in more detail A nonwoven fabric 10 includes a conductive grid 12 comprising a conductive material such as silver, copper, gold, aluminum zinc, nickel, brass, bronze, iron, platinum, steel, lead, stainless steel, any alloy containing one of these, any combination of these, or any conductive material. The non-woven fabric can include material including polyethylene, polypropylene, nylon, polyester, acrylic, carbon, PPS, meta-aramid, para-aramid, polyimide (P84), PTFE, glass, Belcotex, and any combination of these.

In one embodiment, the non-woven fabric can also be made from a polymeric fiber, copolymer or blend. In one embodiment, a polymer, co-polymer blend is used having a melt point greater than 100° C. The copolymer can have a core and a sheath. The sheath can have a melting point lower than that of the core. The core and sheath can be made from polyester. The core can be polyester and the sheath can be a co-polymer.

Figure 5:
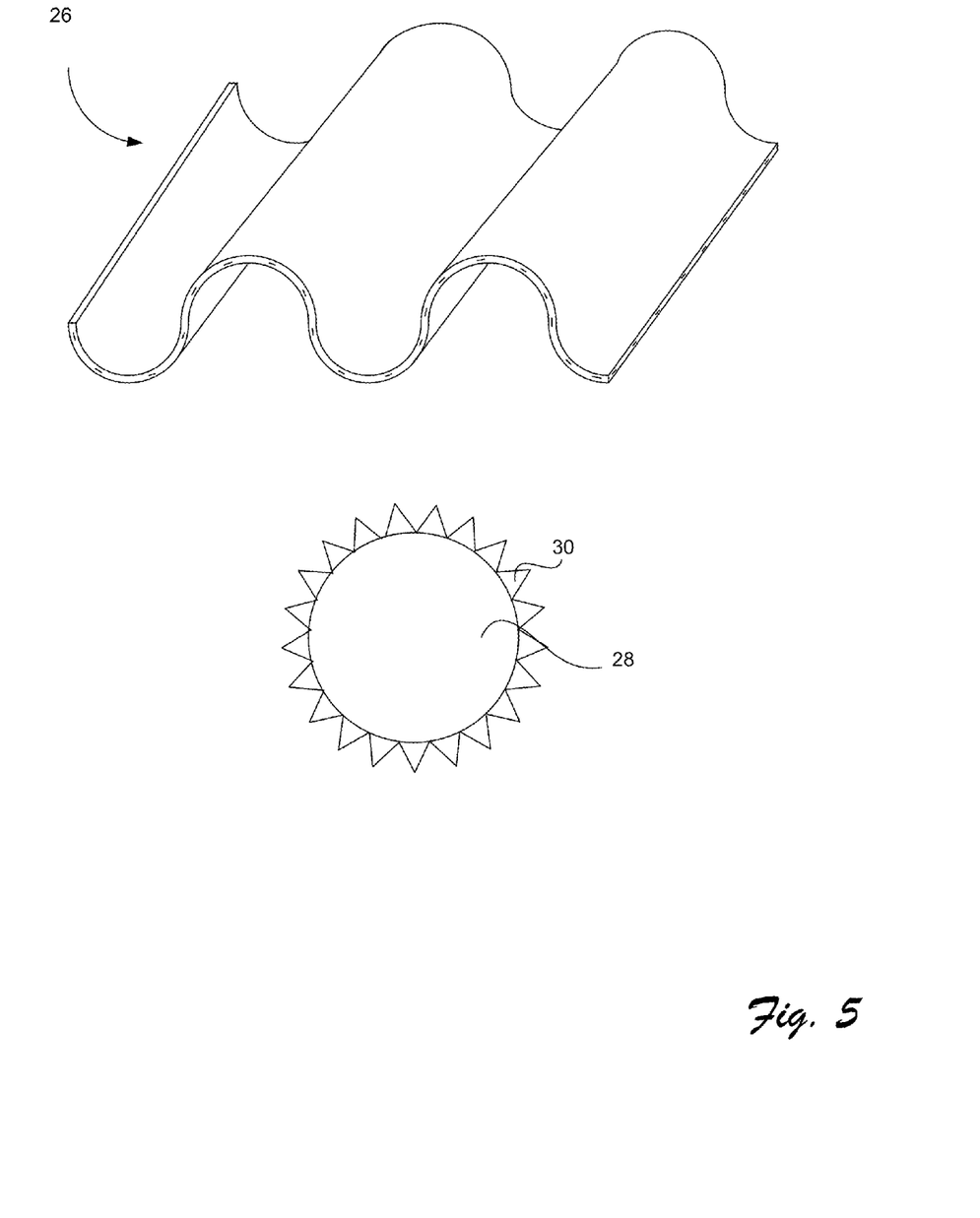
FIG. 5 is a perspective view and top view of applications of the invention.

In these various configurations, the sheath can be melted to bond the co-polymer to adjacent fibers or to add stiffness to the non-woven fabric by heating the non-woven fabric. In one embodiment, the non-woven fabric, after heating, has a stiffness in the range of about 1500 mg to 8000 mg using a Gurley measuring technique. By increasing the stiffness, the non-woven fabric can be pleated, as shown in FIG. 5, to increase the surface area of the non-woven fabric for applications such as for filter media. Further, the non-woven fabric can have an operational temperature up to 150° C. The denier of the non-woven fabric can be between 0.7 and 10 in one embodiment. The conductive grid can be a framework of crisscrossed filaments such as 14a and 14b of conductive material. In one embodiment, the filaments are made from stainless steel.

Figure 2:
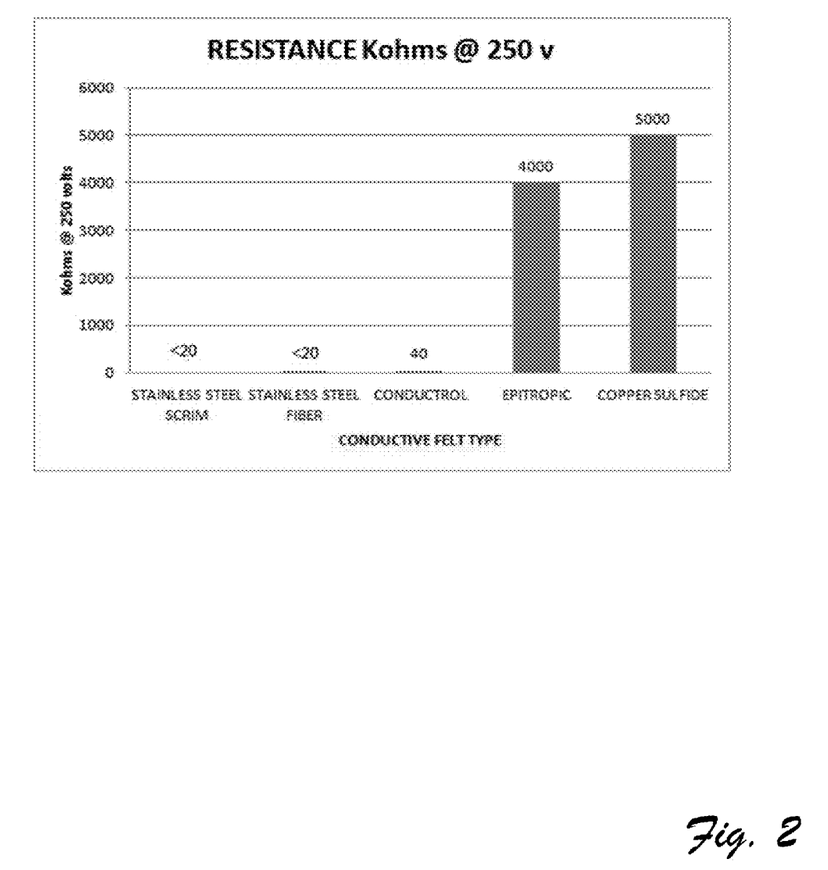
FIG. 2 is a graph showing properties of the invention.

When stainless steel is used for the grid, the non-woven fabric has an electrical resistance of less than 25 kohms when 250 volts (v) is applied across a 12 inch by 12 inch patch of non-woven fabric as shown in FIG. 2. Conductive properties can be altered by treating the non-woven fabric with carbon. In one embodiment, the crisscross filaments define an area 16 meaning 1 $cm^2$. In another embodiment, filament segment 20 has a length in the range of about 0.25 cm to 0.75 cm and segment 22 has a length in the range of about 0.5 cm to 1.5 cm. In one embodiment, segment 20 is 0.5 cm and segment 22 is 1.0 cm. The grid arrangement allows a cut 24 to be made in the fabric while still maintaining a conductive path along the grid. Further, varying arrangements of the fabric can be used such as a pleat 26 (FIG. 5) while again maintaining a conductive path along the grid. In one embodiment, the fabric is pleated and carried by a canister 28 so that structural support is provided and surface area of the filter is increased by the pleated filter media 30.

Figure 3:
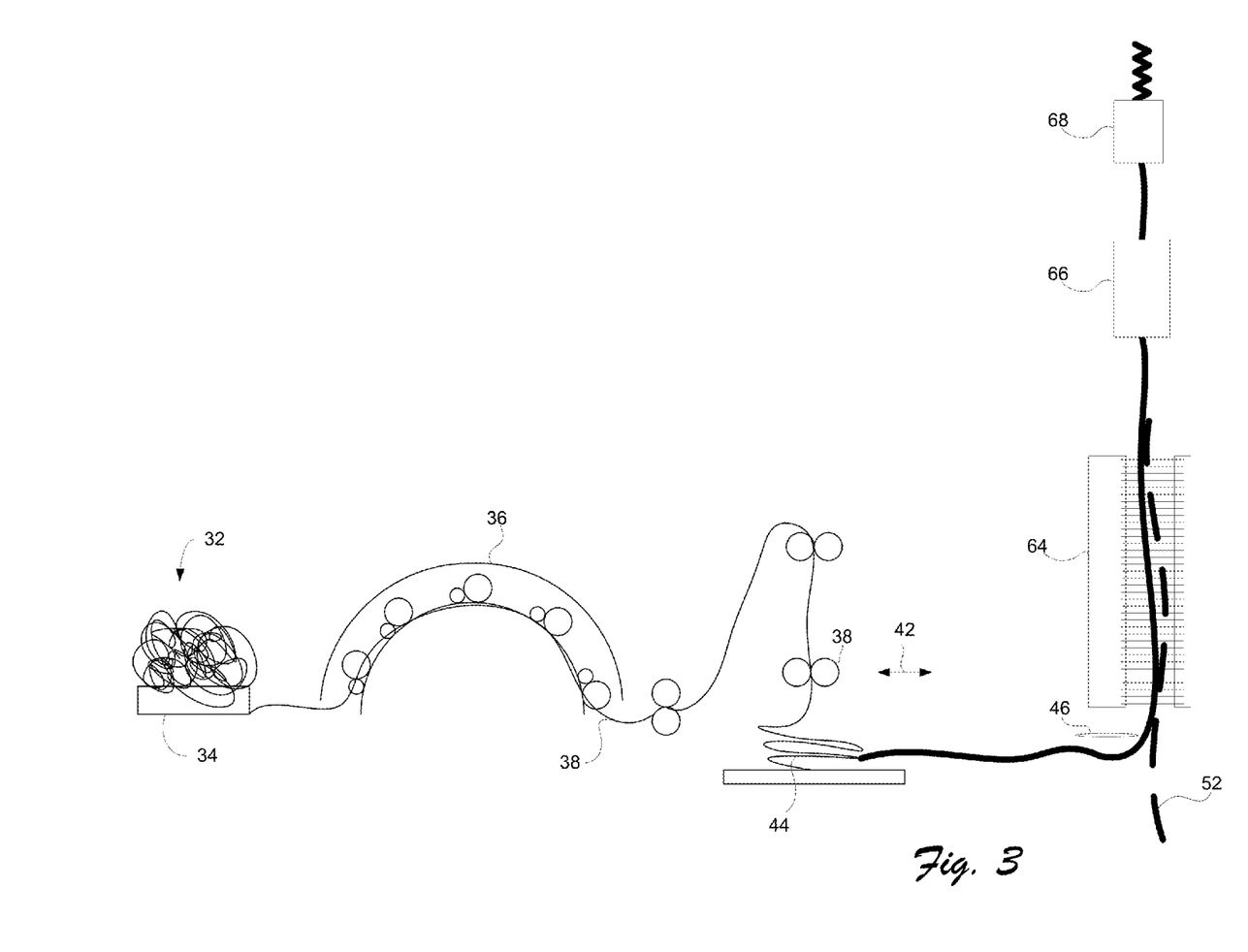
FIG. 3 is a schematic of the method of making the invention.
Figure 4:
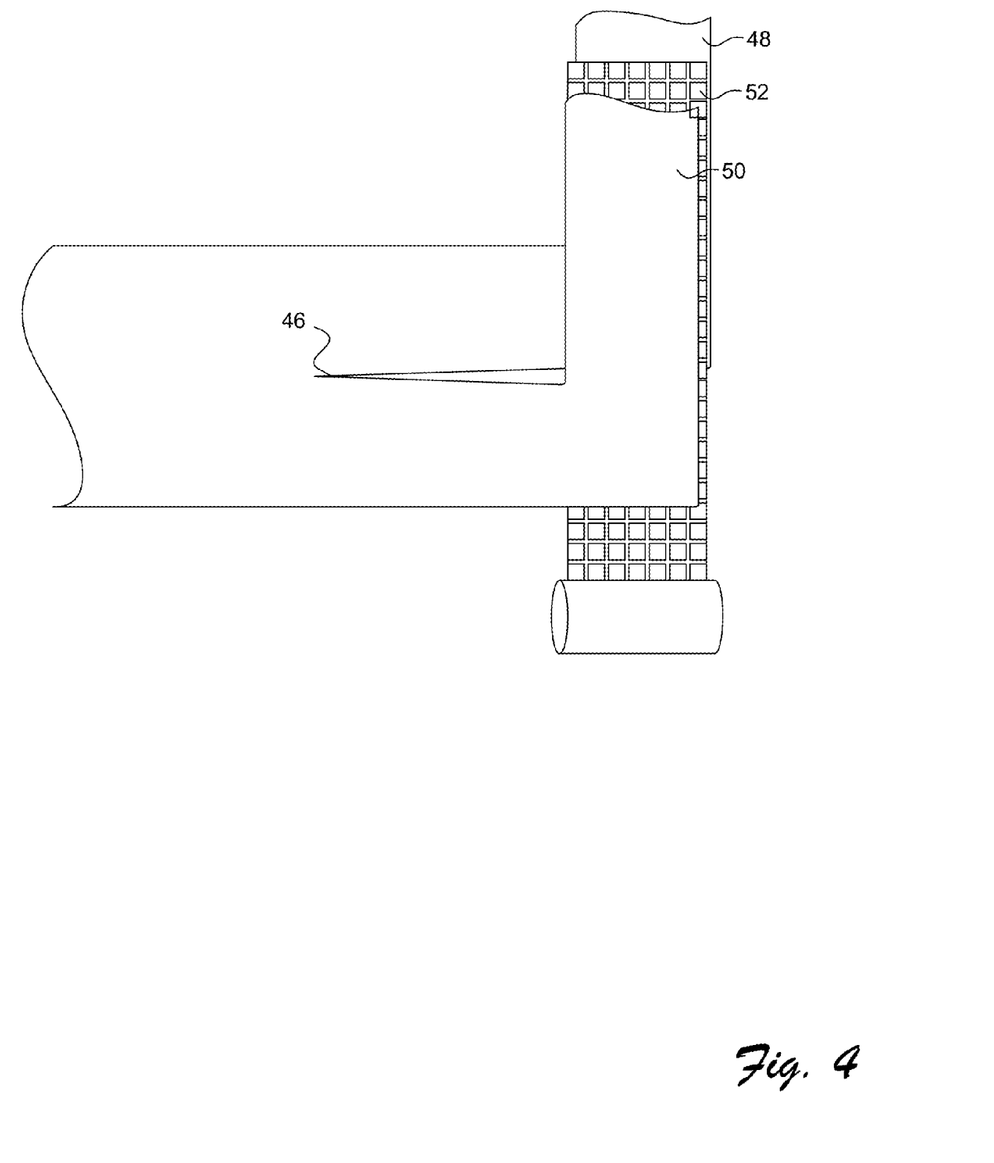
FIG. 4 is a perspective view of the invention.

In one embodiment, conductive fabric, such as filter media, is manufactured in a non-woven manufacturing process. Referring to FIG. 3, raw material 32 such as chopped fibers are placed in a chute 34. The raw material can be blended or a uniform raw material. The raw material is then fed through a carding machine 36 to form a web 38. The web is collected by folding it on top of itself by feed rollers 40 which oscillate in a direction 42 to form a batt 44. The batt is lightly needled through a tacker and can then be cut by cutter 46 to produce two batts 48 and 50 (see FIG. 4.) These two batts are then turned 90° so that batt 48 travels below batt 50 (see FIG. 4). Scrim 52 can be inserted between the top and bottom batts forming layer shown in FIG. 6. The scrim can also be placed on one side creating an asymmetrical layer of construction.

The layers are then fed into a needle punch 64 having a plurality of needles, such as 56. The needles have barbs that interlock and entangle the fibers 72 (see FIG. 6) of batt 48 and batt 50, thereby forming a single non-woven fabric having a grid included within the fabric shown as 60.

Figure 6:
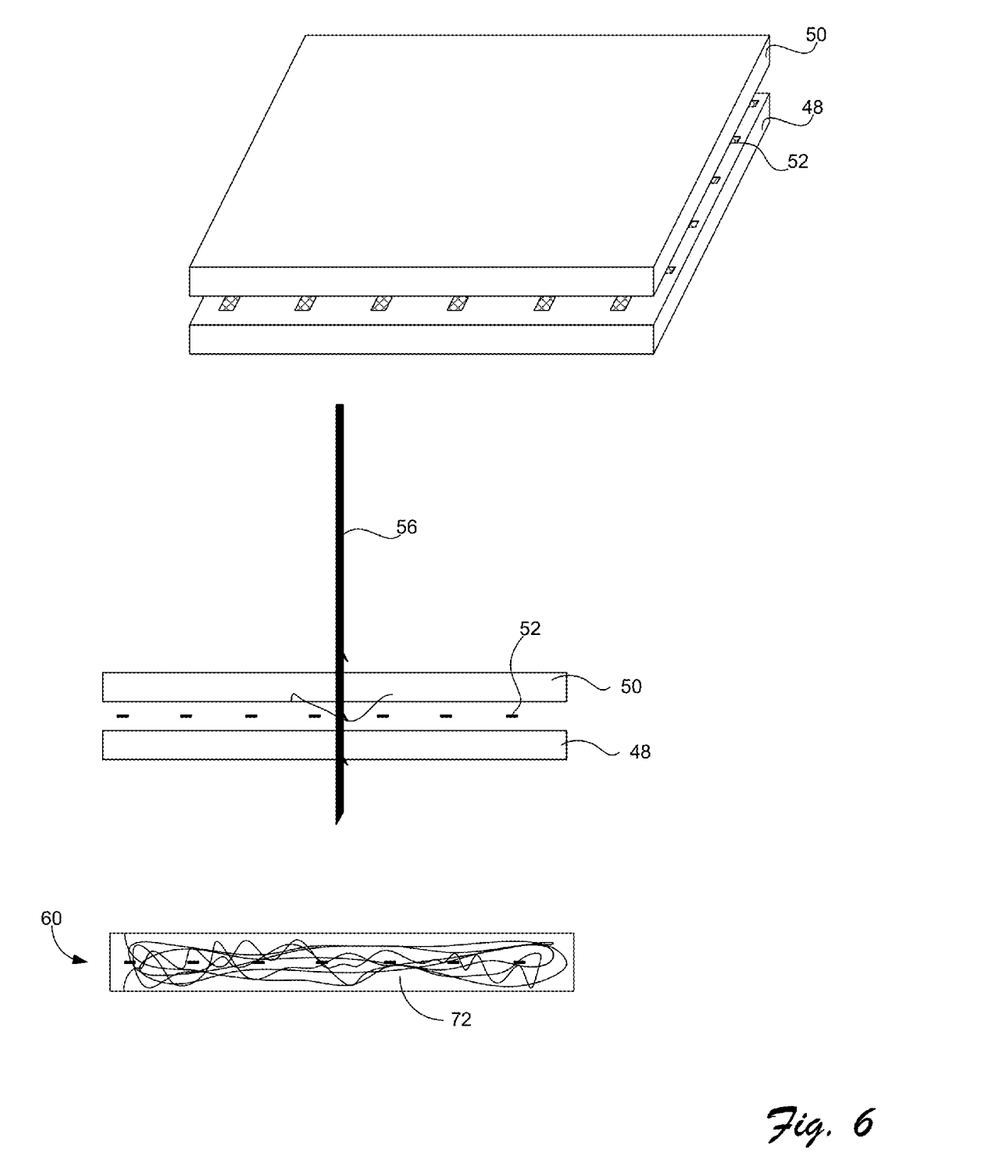
FIG. 6 is a perspective view and elevation view of the invention.

In one embodiment, the grid includes a fabric substrate 62. In one embodiment, the non-woven fabric with the scrim is heated by heater 66 which can increase the stiffness. The fabric can then be pleated by pleating machine 68 and gathered in stacker or roller.

Figure 7:
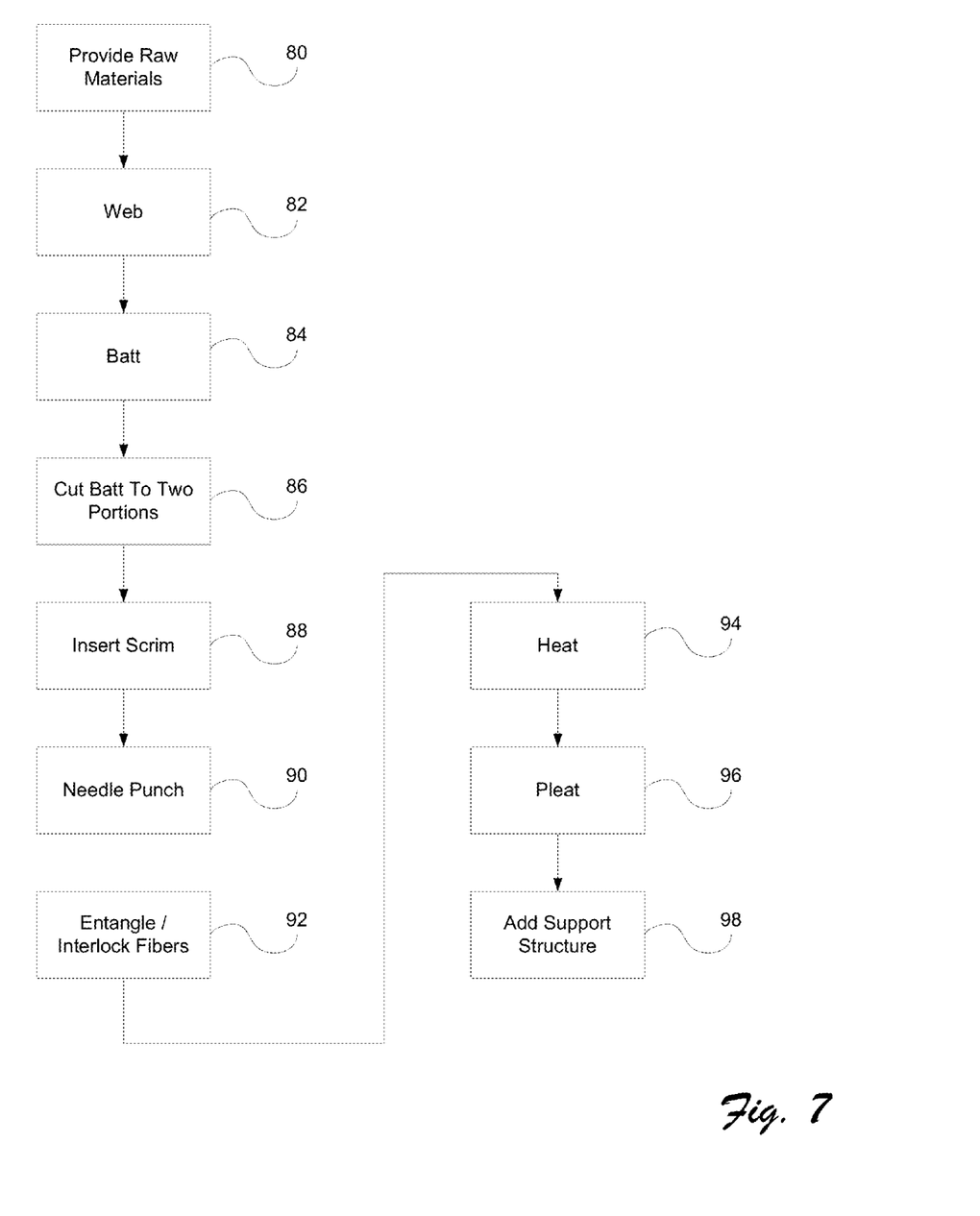
FIG. 7 is a flowchart showing the process of making the invention.

Referring to FIG. 7, the method of manufacturing a non-woven conductive filter media is described. Raw material is provided at 80. The raw material is made into a web at 82. The web is layered into a batt at 84. The batt can be cut at 86 and one portion placed above another portion. The scrim can be placed between the two batts at 88 and the two batts and scrim feed into a needle punch at 90 to interlock and entangle the batt fibers encapsulating the scrim at 92. The non-woven fabric can be heated at 94 and/or pleated at 96. The pleated non-woven fabric can be attached to a support structure such as a filter canister at 98.

While a preferred embodiment of the invention has been described using specific terms, such description is for illustrative purposes only, and it is to be understood that changes and variations may be made without departing from the spirit or scope of the following claims.

What is claimed is:

1. A filter medium for operating environments needing static electricity dissipation to help reduce ignition sources comprising:
   a substrate layer of non-woven felt including a polymeric fiber;
   a conductive scrim having a grid of conductive filaments adjacent to said substrate layer and said filter medium includes an electrical resistance of less than 25 kohms when 250V is applied to said filter medium;
   a top layer of non-woven felt including a polymeric fiber and copolymer fiber blend having a melt temperature greater than 100° C. wherein said substrate layer, said conductive scrim and said top layer are manufactured into said filter medium by mechanical web formation and the substrate layer and said top layer have fibers that are entangled with each other to secure the scrim between the substrate layer and the top layer and,
   wherein said polymeric fiber includes material selected from the group consisting of: polyethylene, polypropylene, nylon, polyester, acrylic, carbon, PPS, meta-aramid, para-aramid, polyimide (P84), PTFE, glass, Belcotex, and any combination of these.

2. The filter medium of claim 1 wherein said top layer has a weight between 1.0 oz and 6.1 oz, said bottom layer has a weight between 1.0 oz and 6.1 oz and said scrim has a weight between 1.0 oz and 6.0 oz.

3. The filter medium of claim 1 wherein said top layer is between 35% and 46% of the total weight of said filter medium.

4. The filter medium of claim 1 wherein said scrim is 10% and 40% of the total weight of said filter medium.

5. The filter medium of claim 1 wherein said filter medium has a stiffness in the range of 1500 mg to 8000 mg using a Gurley apparatus.

6. The filter medium of claim 1 wherein said substrate, scrim and top layer are pleated.

7. The filter medium of claim 1 wherein said scrim includes crisscrossing parallel filaments defining openings having an area of at least one $cm^2$.

8. The filter medium of claim 1 wherein said grid includes material selected from the group consisting of: silver, copper, gold, aluminum, zinc, nickel, brass, bronze, iron, platinum, steel, lead, stainless steel, and any combination of these.

9. The filter medium of claim 1 wherein said filaments are carbon treated.

10. The filter medium of claim 1 wherein said copolymer includes a core member and a sheath member wherein said sheath member has a melting point temperature lower than said core melting point.

11. The filter medium of claim 10 wherein said core member and said sheath member are polyester.

12. The filter medium of claim 10 wherein said core member is polyester and said sheath member is a copolymer.

13. The filter medium of claim 1 wherein said filter medium is heated above said softening point of said sheath thereby bonding to adjacent fibers.

14. The filter medium of claim 1 wherein its operational temperature is less than 150° C.

15. The filter medium of claim 1 wherein the fiber denier is between 0.7 and 10 denier.

16. A filter medium for operating environments needing static electricity dissipation to help reduce ignition sources comprising:
    a substrate of non-woven felt including a polymeric fiber;
    a top layer of non-woven felt carried by said substrate including a polymeric fiber and copolymer fiber blend having a melt temperature greater than 100° C. wherein said substrate layer and said top layer are manufactured into said filter medium by mechanical web formation;
    wherein said polymeric fiber includes material selected from the group consisting of: polyethylene, polypropylene, nylon, polyester, acrylic, carbon, PPS, meta-aramid, para-aramid, polyimide (P84), PTFE, glass, Belcotex, and any combination of these; and,
    and a conductive scrim disposed between said substrate and said top layer so that said filter medium includes the physical property of having an electrical resistance of less than 25 kohms when 250V is applied to said filter medium.

* * * * *

UNITED STATES PATENT AND TRADEMARK OFFICE
CERTIFICATE OF CORRECTION

PATENT NO.        : 9,085,837 B2
APPLICATION NO.   : 13/627751
DATED             : July 21, 2015
INVENTOR(S)       : Eric Winters et al.

Page 1 of 1

It is certified that error appears in the above-identified patent and that said Letters Patent is hereby corrected as shown below:

On Title Page, Bibliography, Item (71), delete "Eric Winters, North Augusta, SC (US); John Lewis, North Augusta, SC (US); Brian Fields, North Augusta, SC (US)" from the Applicants section, and insert --Southern Felt Company, Inc., North Augusta, SC (US)--;

On Column 1, Line 3, delete "CLAIM FOR PRIORITY"; and

On Column 1, Lines 5-7, delete "This application claim priority on U.S. patent application Ser.No. 13/454,210 filed Apr. 24, 2012 and is a continuation-in-part thereof.".

Signed and Sealed this
Seventh Day of June, 2016

Michelle K. Lee
*Director of the United States Patent and Trademark Office*